UNITED STATES PATENT OFFICE.

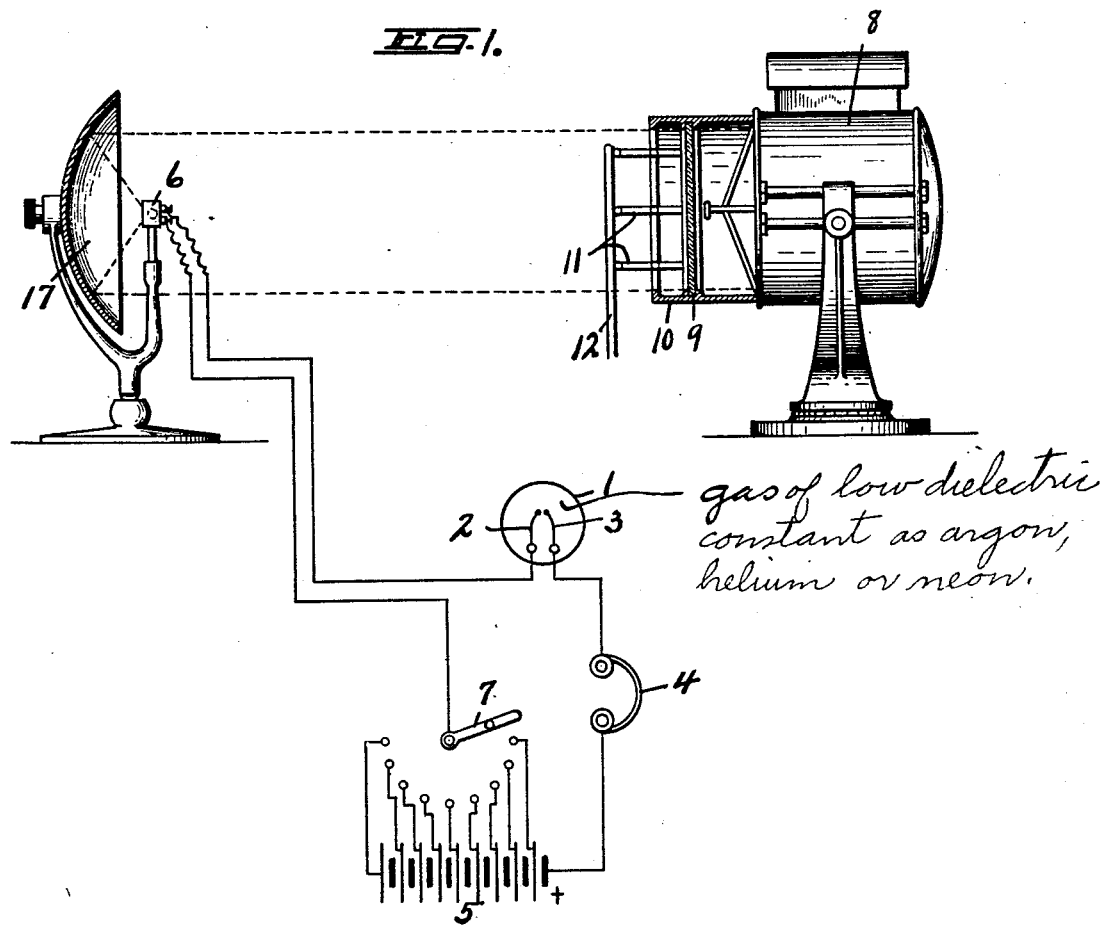

THEODORE WILLARD CASE, OF SCIPIO, NEW YORK.

SIGNALING SYSTEM.

1,369,781.  Specification of Letters Patent.  Patented Mar. 1, 1921.

Application filed February 20, 1918. Serial No. 218,308.

*To all whom it may concern:*

Be it known that I, THEODORE W. CASE, a citizen of the United States of America, and resident of Scipio, in the county of Cayuga, in the State of New York, have invented new and useful Improvements in Signaling Systems, of which the following, taken in connection with the accompanying drawings, is a full, clear, and exact description.

This invention relates to certain new and useful signaling systems and apparatus for carrying out the same.

One of the principal objects of the invention is to provide a novel and highly sensitive system for detecting light rays both visible and invisible and translating said rays into signals of an audible or other character.

Another object of the invention is to utilize light waves emitted from a suitable source to vary a local current in accordance with variations in the light waves produced at the sending station and to such an extent or in such manner that an indicating or translating instrument can respond to such variations. Another object relates to the production of a simple and reliable apparatus for the purposes described.

Other objects and advantages will appear from the following description taken in connection with the accompanying drawings in which—

Figure —1— illustrates the apparatus, a portion of the same being shown diagrammatically.

Fig. —2— is a cross section through the light reactive cell.

In the system here illustrated, I employ transmitting means for sending light rays and receiving means comprising a light responsive device for detecting incoming light rays and translating same into audible or other signals. It is important in systems of this character that as strong a signal as possible be produced so that the effective range of the system will be large.

I have discovered that a pulsation generator may be controlled by a light responsive device and may in turn control an indicating instrument to produce a strong response in the latter on slight change of impedance of the light responsive device. While other forms of hook-ups of the pulsation generator may be employed, the one illustrated herein is perhaps preferable and is found highly efficient for the purpose herein described.

The pulsation generator comprises a tube or bulb —1— which may be a vacuum tube or bulb and may contain a suitable gas such as argon, helium or neon, the dielectric constant of which gas is considerably less than that of air, permitting the use of low voltage in the local circuit hereinafter described. The bulb —1— contains a plurality of electrodes, in this case two in number, and identified by numerals —2— and —3—, respectively. These electrodes may be of platinum or other material and may be in the form of balls, plates, points or the like and may be spaced apart a suitable distance in accordance with the conditions hereinafter prescribed.

The indicating device may preferably take the form of telephone receivers —4— connected in series with battery —5— and light reactive cell —6— across the terminals of the electrodes —2— and —3—. The light reactive cell —6— may be of any suitable form and of any desired construction and, as illustrated in Fig. —2—, the sensitive element or light reactive substance —13— may be supported by a pair of posts —14— of gold or other metal secured to but insulated from a casing —15—. A water tight glass cover plate —16— may be provided for the casing. Reference is made to my copending applications Serial Nos. 195,652 and 195,653, filed October 9, 1917, as disclosing suitable substances or materials of which the light reactive cell may be formed.

I may also utilize a reflector or mirror —17— of proper form and shape and suitably arranged to concentrate or focus the light rays upon the light reactive substance —13—. Preferably the voltage of battery —5— should be adjustable and for this purpose I have provided a multi-point switch —7— tapped in at various points of the battery, permitting a normal adjustment of the frequency of pulsation of current in the local circuit.

The sending means comprises a source of illumination for certain purposes preferably including a screen for transmitting only invisible rays and means for interrupting and establishing the transmission of such rays at will. The source of illumination may be an ordinary incandescent bulb or may assume the form of a universally mounted high intensity search-light —8— capable of casting a beam of substantially parallel rays.

If it is desired to transmit only the infra red rays, a screen —9— of smoked glass of sufficient thickness to transmit only such rays or other substances opaque to short wave length light rays may be employed. The screen —9— may be conveniently located transversely of the drum shape extension —10— on the front of the searchlight.

While the beam may be controlled by making and breaking the searchlight current, if the electric search-light is used, I prefer to use a shutter because of its simplicity and reliability, thus a shutter —11— of opaque material may be mounted at the front end of the extension —10— and may be opened or closed by means of a rod —12— adapted to be operated manually, or otherwise.

The operation of the receiving set or apparatus is at present believed to be about as follows: The light reactive cell or substance —6— constitutes a relatively high resistance in the receiving circuit. The potential of battery —5—, the resistance of said cell or substance, the conditions existing in bulb —1— namely:—The form and shape of the electrodes, the distance they are spaced apart, the vacuum, partial vacuum or atmospheric condition within the bulb and the nature of the gas it may contain with particular relation to the dielectric constant of such gas, are so adjusted and correlated that the pulsations generated may produce an audible note in the receivers —4—. The pulsation in the circuit is doubtless produced by the fact that the potential builds up on one of the electrodes as —3— until the breaking point under the existing conditions is reached.

A discharge then takes place from the higher potential to the lower potential electrode. No further discharge takes place until the potential again builds up at the electrode —3— to the breaking point.

This action of building up and discharging is quite rapid and results in producing pulsations in the local circuit, the frequency of which pulsations may be determined by proper relation of the elements in the local circuit and may be varied by adjusting suitable elements so that as adjusted they are properly related to each other to effect a discharge between the electrodes at a desired rate and preferably at a normal rate or frequency producing an audible note or a note bordering on audibility in the receivers.

The frequency of pulsation in the circuit under normal condition of the light reactive cell —6— is readily and markedly varied by any change in the resistance of the cell —6—, such as is effected by variation in the light rays to which the cell is exposed. Any variation in the light rays is immediately translated into variation of frequency of pulsations in the receiving circuit, thereby varying the pitch of the note heard in the receivers —4—.

With this apparatus, a very slight amount of current is utilized and recharging of the batteries is only required at very infrequent intervals.

By so relating the elements of the local circuit that the normal frequency of pulsation is just beyond the range of audibility, no note will be produced in the receivers except when the resistance of the circuit is varied by change in intensity of light to which the light cell is exposed whereby the rate of pulsation is brought to an audible frequency.

While the apparatus as shown is adapted for use in a system of signaling and as a unitary article, I desire it understood that the receiving portion of the apparatus is adapted for use in other connections as, for instance, in a system by which the blind read by sound and I do not desire to limit myself to the particular combination of elements shown herein and when said combination is specifically claimed I desire it understood that various means for transmitting light rays may be utilized, the one herein shown being purely illustrative and that various forms of light reactive cell and various substances of which the light reactive portion of the same may be formed, may be utilized without departing from the spirit of this invention as set forth in the appended claims.

What I claim is:

1. In an apparatus of the class described, means for transmitting light rays and means responsive to said transmitted rays including a bulb containing a gas of low dielectric constant and a pair of spaced electrodes and a light reactive substance, a potential and a translating device connected in series across the terminals of said electrodes.

2. In an apparatus of the class described the combination with a bulb containing a gas of low dielectric constant and a pair of spaced electrodes of a light reactive substance, a potential and an indicating device connected in series across the terminals of said electrodes.

3. In a signaling apparatus, means for transmitting light rays, a normally pulsating current circuit including a pair of spaced electrodes, a light reactive resistance, and a source of potential, a receptacle inclosing said electrodes and containing a gas of low dielectric constant, said elements so correlated that variations of resistance in said circuit as effected by variations in the transmitted light to which said light reactive resistance is exposed, causes said circuit to pulsate at an audible frequency, and means for translating said pulsations into audible signals.

4. In a signaling apparatus, means for transmitting light rays, a pair of spaced electrodes, a partially evacuated bulb containing an inert gas inclosing said electrodes, a light re-active resistance and a source of potential connected across the electrodes, and means for translating variations in the light re-active resistance as caused by variations in said transmitted rays into signals.

5. In a signaling apparatus, means for transmitting light rays, a pair of spaced unheated electrodes, a partially evacuated bulb containing a gas of low di-electric constant inclosing said electrodes, a light re-active resistance and a source of potential connected across the electrodes, and means for translating variations in the light re-active resistance as caused by variations in said transmitted rays into signals.

In witness whereof I have hereunto set my hand this 2nd day of February, 1918.

THEODORE WILLARD CASE.

Witnesses:
EARL F. SPONABLE,
BLIN S. CUSHMAN.

| | | |
|---|---|---|
| Fessenden, | 1,133,435 | 179-171 |
| De Forest, | 836,071 | 250-8 |
| Pierce, | 1,112,549 | 179-171 (250-42) |
| Zickler, | 625,823 | 250-11 |
| De Forest, | 1,221,035 | 250-8 |
| De Forest et al, | 1,170,881 | " |
| De Moura, | 775,337 | 250-7 |
| Langmiour, | 1,273,628 | 250-27 |
| British to Squier, | 108,230 | 178-51 |
| French patent, | 418,373 | 250-8 |